Sept. 11, 1962    J. C. MOORE    3,053,548
TRAILING ARM TYPE SUSPENSION MEANS FOR VEHICLES
Filed March 3, 1961    2 Sheets-Sheet 1

INVENTOR
JOHN CHARLES MOORE
BY~ *Fetherstonhaugh & Co*
ATTORNEYS

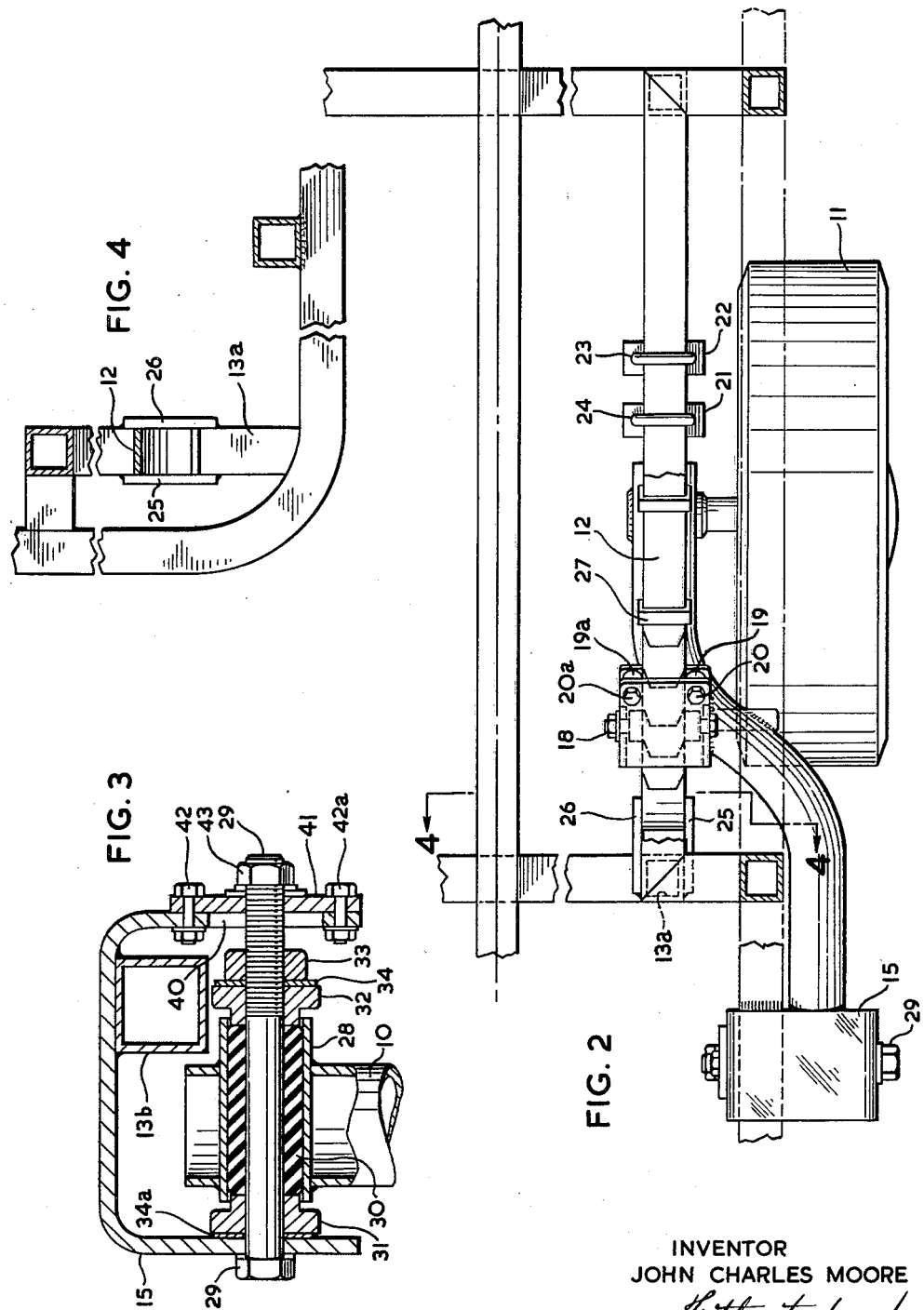

United States Patent Office 3,053,548
Patented Sept. 11, 1962

3,053,548
TRAILING ARM TYPE SUSPENSION
MEANS FOR VEHICLES
John C. Moore, 174 Broadway Ave., Toronto,
Ontario, Canada
Filed Mar. 3, 1961, Ser. No. 93,089
4 Claims. (Cl. 280—124)

This invention relates to suspension systems for vehicles and specifically relates to an independent suspension system particularly suitable for small vehicles such as boat trailers.

The advantages of independent suspension in vehicles are well known. Not the least of these advantages is due to the elimination of axles which extend from one side of the vehicle to the other. With this arrangement the vehicle chassis can be slung lower than is otherwise possible whereby to achieve greater stability. There are many known independent systems but their use is mainly confined to vehicles which are otherwise relatively high priced, such as automobiles. However, in the manufacture of small automobile trailers and boat trailers which are relatively low priced vehicles, it is still the practice to use full axles betwen the wheels since the manufacturing costs of the known independent suspension systems are much too high compared with the manufacturing costs of the trailers as a whole.

It is, therefore, an object of this invention to provide an independent suspension system for vehicles and while the system in accord with this invention is capable of use on high priced vehicles, such as automobiles, it is so inexpensive to manufacture as to be particularly suited to use on low priced vehicles such as small automobile trailers and boat trailers.

It is a further object of this invention to provide an independent suspension system having a variable spring resistance which increases automatically with increasing load on the vehicle.

It is a still further object of this invention to provide an independent suspension system which includes shock absorbing means in addition to the variable spring resistance above mentioned.

With these and other objects in mind, the suspension system in accord with this invention essentially consists of a trailing arm fixed at its upper end to the vehicle frame and carrying a wheel at its lower end, said trailing arm being inclined to the vertical under all normal operating conditions; and leaf spring means connected at one end to the vehicle frame and having its free end resting on support means carried by the trailing arm, said leaf spring means also being inclined to the vertical but in the opposite sense to the angle of inclination of said trailing arm. By this arrangement, an increasing load on the vehicle will cause the angle of inclination of the trailing arm to increase with respect to the vertical whereby to cause the support means carried by the trailing arm to move towards the fixed end of the spring means as to shorten the effective length of the spring thereby automatically increasing the spring resistance with increasing load on the vehicle.

The invention will be more fully understood from the following description of one embodiment thereof to be read in conjunction with the accompanying drawings in which:

FIGURE 1 is a side elevation view of the suspension means in accord with this invention as used on a small two-wheeled trailer or the like.

FIGURE 2 is a plan view of the suspension means illustrated in FIGURE 1.

FIGURE 3 is a cross section view taken along lines 3—3 of FIGURE 1, and

FIGURE 4 is a cross section view taken along lines 4—4 of FIGURE 2.

Figure 1:
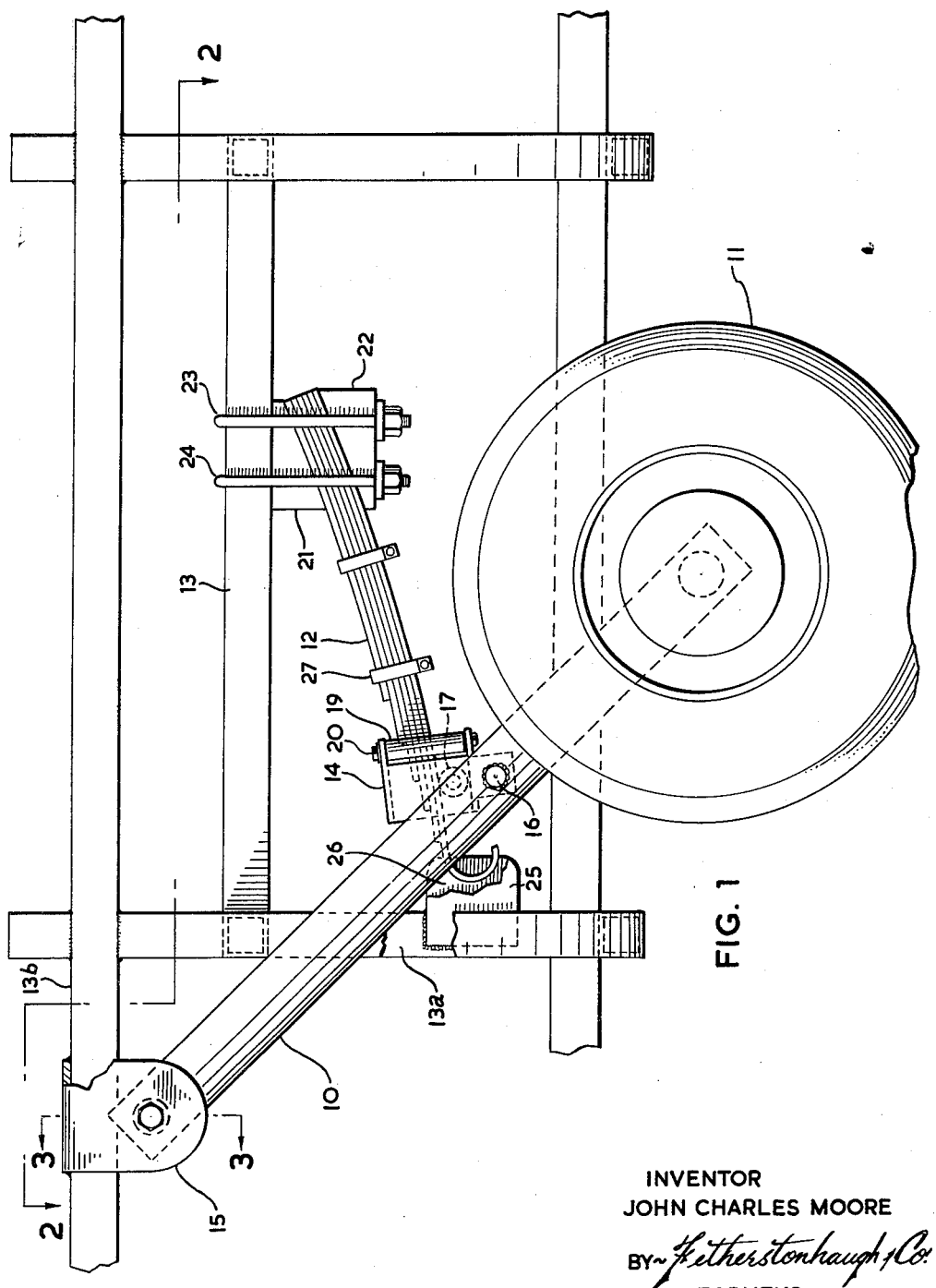

Referring to FIGURE 1, the suspension means in accord with this invention essentially consists of a trailing arm 10 carrying a wheel 11 at its free end, a quarter-elliptic leaf spring 12 fixed to the vehicle frame 13 and a box-like spring cage member 14 for operatively interconnecting trailing arm 10 with spring 12. At its upper end, trailing arm 10 is fixed to the vehicle frame by means of a bracket member 15. As will be explained in detail hereinafter, bracket 15 carries a resilient bushing which acts as a shock absorber to dampen the pivotal movement of the trailing arm.

As is best seen in FIGURE 1, the lower or free end of spring 12 rests on a support member carried by the trailing arm 10. In the illustrated embodiment of the invention, this support member consists of a roller 17 rotatably mounted within spring cage 14 which is fixed to a cage mounting arm 16 carried on the trailing arm 10. As will be readily apparent, an increasing load on the trailer will cause the angle of inclination of trailing arm 10 to increase with respect to the vertical, or more simply put, the trailing arm swings upwardly with respect to the vehicle chassis or frame. When this happens the spring cage 14 advances towards the fixed end of spring 12 whereby to shorten the effective length of the spring. Thus the spring resistance automatically increases with increasing load. To guide the travel of spring cage 14 on spring 12, the spring cage also carries a pair of substantially vertical side rollers 19 and 19a. Although rollers 19 and 19a have been described as substantially vertical, it will be appreciated that their attitude with respect to the vertical will vary and they may be more precisely described as being arranged substantially at right angles to the length of spring 12. Rollers 19 and 19a are free to rotate about the roller axles 20 and 20a. Since spring 12 is made of a relatively hard spring steel or the like, side rollers 19 and 19a are made of an equally hard material or an even harder material such as cast iron as to avoid wearing grooves in the rollers over a period of time. Roller 17 may be of rubber or a soft metal such as brass because it rides on a flat surface as opposed to the side rollers 19 and 19a which ride on the side edges of the spring.

Spring 12 is fixed to frame 13 by means of a pair of pillow blocks 21 and 22 and U-bolts 23 and 24. The dimensions of pillow blocks 21 and 22 are chosen as to predetermine the correct inclination of spring 12 with respect to frame 13 and the suspension means as a whole. It will be appreciated, of course, that the particular method of fixing spring 12 to the frame is not critical so long as the proper inclination of the spring is achieved and so long as the spring will remain in its predetermined position with use.

To prevent any sideways movement of spring 12, its free end is guided between two plate members 25 and 26 welded to member 13a of frame 13. As is best seen in FIGURE 1, the lowermost leaf of spring 12 is curled under as to provide a broad contact area with plate members 25 and 26. The plate members 25 and 26 also provide a lower limit to the travel of spring cage 14. The upper limit of travel is met at the first leaf spring bracket 27. In actual fact, however, the upper limit is seldom reached since the strength of the leaf spring increases very rapidly toward bracket 27. In other words, the strength of the spring in its upper region is sufficiently great to prevent the spring cage from reaching bracket 27. Furthermore, the lower limit, i.e., plate members 25 and 26 are seldom reached because of the torsional resistance of the shock absorber means within bracket 15.

As is best seen in FIGURE 2, trailing arm 10 is bent in the region of cage mounting arm 16 so that it is somewhat crank shaped. This arrangement is a matter of expediency and permits a close spacing of the various components of the suspension system.

Referring now to FIGURE 3, it will be seen that bracket 15 is welded to the upper horizontal member 13b of frame 13. The upper end of trailing arm 10 is bored to receive a bushing housing tube 28 which is permanently fixed to the trailing arm as by welding or the like. The bolt member 29 interconnects tube 28 and bracket 15.

Arranged between bolt 29 and the inside surface of tube 28 is a rubber bushing member 30. Two compression aligning members 31 and 32 are freely carried on bolt 29, one at either end of tube 28. Nut 33 forces the compressors 31 and 32 towards each other which action compresses rubber bushing 30 against both bolt 29 and the inside surface of tube 28. A pair of lock washers 34 and 34a maintain nut 33 in its tightened position. Bushing member 30 is compressed so tightly as to prevent any relative movement between the bushing and tube 28 or bolt 29. Thus, trailing arm 10 pivots with respect to bracket 15 only as much as the resiliency of rubber bushing 30 will permit. Thus, bushing 30 acts as a shock absorber. When the suspension system is assembled, it is important to orient trailing arm 10 with respect to frame 12 so that rubber bushing 30 will be virtually unstressed when there is no load on the trailer. By so doing, rubber bushing 30 will be capable of restraining any clockwise movements of trailing arm 10 about bolt 29 (as seen in FIGURE 1). Furthermore, this arrangement will provide torsional resistance on the part of bushing 30 against full movement of spring cage 14 against the lower limit provided by plates 25 and 26.

Since the various components illustrated in FIGURE 3 must be assembled in situ, one arm of bracket 15 is provided with a large aperture 40 to enable the person who is putting the unit together to slide the rubber bushing 30 and the compressor 32 onto bolt 29 after the bolt has been passed through the tube 28. Aperture 40 is then covered with the cover plate 41 which is held to bracket 15 by the fastening units 42 and 42a. As a last step in the assembling process, bolt 29 is tightened by the nut 43.

The above described embodiment of this invention is ideally suited to use on small automobile trailers and boat trailers. It is inexpensive to manufacture, requires little maintenance and is highly efficient in operation.

What I claim as my invention is:

1. Suspension means for a wheeled vehicle comprising a trailing arm pivotally connected at its upper end to the frame of the vehicle and rotatably carrying a wheel at its lower end, said trailing arm being inclined to the vertical under all normal operating conditions; a quarter elliptic leaf spring having its butt end fixed to the vehicle frame and having its longest leaf lowermost, said leaf spring also being inclined to the vertical but in the opposite sense to the angle of inclination of said trailing arm, a first roller mounted for rotation on a substantially horizontal axle carried by said trailing arm, said first roller supporting the free end of said leaf spring at varying distances from the fixed end thereof as the angle of inclination of said trailing arm changes with varying load on said vehicle, and a spring cage device for maintaining said leaf spring on said first roller as the distance of said first roller from the fixed end of the leaf spring changes, said spring cage device carrying a pair of side rollers in juxtaposition with the side edges of said leaf spring and mounted for rotation on axles disposed on either side of said leaf spring, said axles being disposed substantially at right angles to the longitudinal axis of said leaf spring.

2. Suspension means as claimed in claim 1, in which the tip of the lowermost leaf of said leaf spring is curled under and including a pair of parallel plate members carried by said frame and disposed on either side of the said tip of the lowermost leaf whereby to provide lateral support to said leaf spring and said trailing arm.

3. Suspension means as claimed in claim 2, in which said trailing arm is attached to said frame at its upper end at a point spaced laterally of the vertical plane defined by said leaf spring, said trailing arm being bent as to bring said support means into registry with said spring.

4. Suspension means as claimed in claim 3, in which said leaf spring is anchored to said frame by means of a pair of pillow block members disposed above and below the butt end of said spring and a pair of U-bolts and crossmembers engaged on a horizontal member of said frame and about said pillow blocks.

References Cited in the file of this patent

UNITED STATES PATENTS

| | | |
|---|---|---|
| 1,656,074 | Poyet | Jan. 10, 1928 |
| 1,745,881 | Wood | Feb. 4, 1930 |
| 2,308,967 | Kuss | Jan. 19, 1943 |
| 2,880,991 | Ward | Apr. 7, 1959 |

FOREIGN PATENTS

| | | |
|---|---|---|
| 613,477 | France | Aug. 27, 1926 |